United States Patent
Zeniya et al.

(10) Patent No.: US 11,069,457 B2
(45) Date of Patent: Jul. 20, 2021

(54) WIRE HARNESS THAT ENABLES A WIRING PATH TO BE EASILY CHANGED

(71) Applicant: SUMITOMO WIRING SYSTEMS, LTD., Yokkaichi (JP)

(72) Inventors: Junpei Zeniya, Yokkaichi (JP); Naoto Tsukimori, Yokkaichi (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 0 days.

(21) Appl. No.: 16/767,862

(22) PCT Filed: Nov. 26, 2018

(86) PCT No.: PCT/JP2018/043307
§ 371 (c)(1),
(2) Date: May 28, 2020

(87) PCT Pub. No.: WO2019/107290
PCT Pub. Date: Jun. 6, 2019

(65) Prior Publication Data
US 2020/0381139 A1 Dec. 3, 2020

(30) Foreign Application Priority Data
Nov. 30, 2017 (JP) .............................. JP2017-230884

(51) Int. Cl.
*H01B 7/00* (2006.01)
*B60R 16/02* (2006.01)
*H01B 7/02* (2006.01)

(52) U.S. Cl.
CPC ....... *H01B 7/0045* (2013.01); *B60R 16/0215* (2013.01); *H01B 7/0216* (2013.01)

(58) Field of Classification Search
CPC .. H01B 7/0045; H01B 7/0216; B60R 16/0215
USPC ........................................................ 174/72 A
See application file for complete search history.

(56) References Cited

U.S. PATENT DOCUMENTS

| | | | |
|---|---|---|---|
| 2011/0132638 A1 | 6/2011 | Oga et al. | |
| 2011/0155458 A1* | 6/2011 | Kato | C07C 227/04 174/74 R |
| 2016/0101747 A1* | 4/2016 | Inao | H02G 3/0487 174/72 A |
| 2016/0336094 A1* | 11/2016 | Omura | H01B 7/2825 |
| 2017/0066144 A1* | 3/2017 | Michael | B26B 1/10 |

FOREIGN PATENT DOCUMENTS

| | | |
|---|---|---|
| JP | 2011-150991 A | 8/2011 |
| JP | 2011-155763 A | 8/2011 |

OTHER PUBLICATIONS

Jan. 15, 2019 International Search Report issued in International Patent Application No. PCT/JP2018/043307.

* cited by examiner

*Primary Examiner* — Timothy J Thompson
*Assistant Examiner* — Michael F Mcallister
(74) *Attorney, Agent, or Firm* — Oliff PLC

(57) ABSTRACT

A wire harness including: a wire including a core wire and an insulating covering that covers the core wire; an electromagnetic shield that covers and electromagnetically shields at least the core wire; a path regulator that has higher flexural rigidity than the wire and that is formed in an elongated shape; and a cover that covers the wire, the electromagnetic shield, and the path regulator, wherein the wire is fixed along the path regulator.

7 Claims, 6 Drawing Sheets

WIRE HARNESS THAT ENABLES A WIRING PATH TO BE EASILY CHANGED

BACKGROUND

The present disclosure relates to a wire harness.

Conventionally, wire harnesses including a wire whose outer side is covered by an exterior member such as a corrugated tube are known (see e.g., JP 2010-51042A). The wire harness of JP 2010-51042A uses a protector at portions where it is necessary to regulate the path thereof.

Since a large current is supplied to wires in wire harnesses used for electric vehicles and the like, the circumference of the wires in some of these wire harnesses is covered by an electromagnetic shielding member as a countermeasure to electromagnetic noise.

SUMMARY

Meanwhile, the above-described wire harnesses use protectors at portions where it is necessary to regulate the path thereof. The protector is a resin molded article, and includes a main body that is open at upper, front and rear sides, and a cover that closes the upper side of the main body. The front and rear openings of the opening main body serve as the inlet and the outlet of the wire, and a wiring path of the wire is provided on the inner sides of the main body and the cover. Accordingly, in the case of changing the wiring path, it is necessary to remake a mold for molding the protector, thus leading to a cost increase and also requiring a significant amount of time.

An exemplary aspect of the disclosure provides a wire harness that enables a wiring path to be easily changed.

A wire harness according to an exemplary aspect includes a wire including a core wire and an insulating covering that covers the core wire; an electromagnetic shield that covers and electromagnetically shields at least the core wire; a path regulator that has higher flexural rigidity than the wire and that is formed in an elongated shape; and a cover that covers the wire, the electromagnetic shield, and the path regulator, wherein the wire is fixed along the path regulator.

According to the above-described aspect, it is possible to regulate the path of the wire by fixing the wire to the path regulator having higher flexural rigidity than the wire. In addition, if it becomes necessary to change the wiring path of the wire, the path regulator may be two-dimensionally or three-dimensionally bent as appropriate, for example, using a bender machine. Accordingly, the wiring path of the wire can be more easily changed as compared with a case where the path of the wire is regulated using a protector.

In the above-described wire harness, it is possible to adopt a configuration in which the electromagnetic shield covers an outer side of the insulating covering.

In the above-described wire harness, it is possible to adopt a configuration in which the electromagnetic shield covers the path regulator.

In the above-described wire harness, it is possible to adopt a configuration in which the wire harness includes an x-number (where x≥2) of the wires, wherein, of the x-number of the wires, a y-number (where 1≤y≤x−1) of wires are fixed to the path regulator using a first fixation member, and, of the x-number of the wires, a z-number (where 1≤z≤x) of wires including at least one wire other than the y-number of the wires are fixed to the path regulator using a second fixation member.

In the above-described wire harness, the path regulator may be made of metal.

In the above-described wire harness, the path regulator may be formed of the same kind of metal as the electromagnetic shield.

In the above-described wire harness, an end of the path regulator is covered by a protection member.

With the wire harness according to the present disclosure, the wiring path can be easily changed.

DETAILED DESCRIPTION OF EMBODIMENTS

First Embodiment

Figure 1:
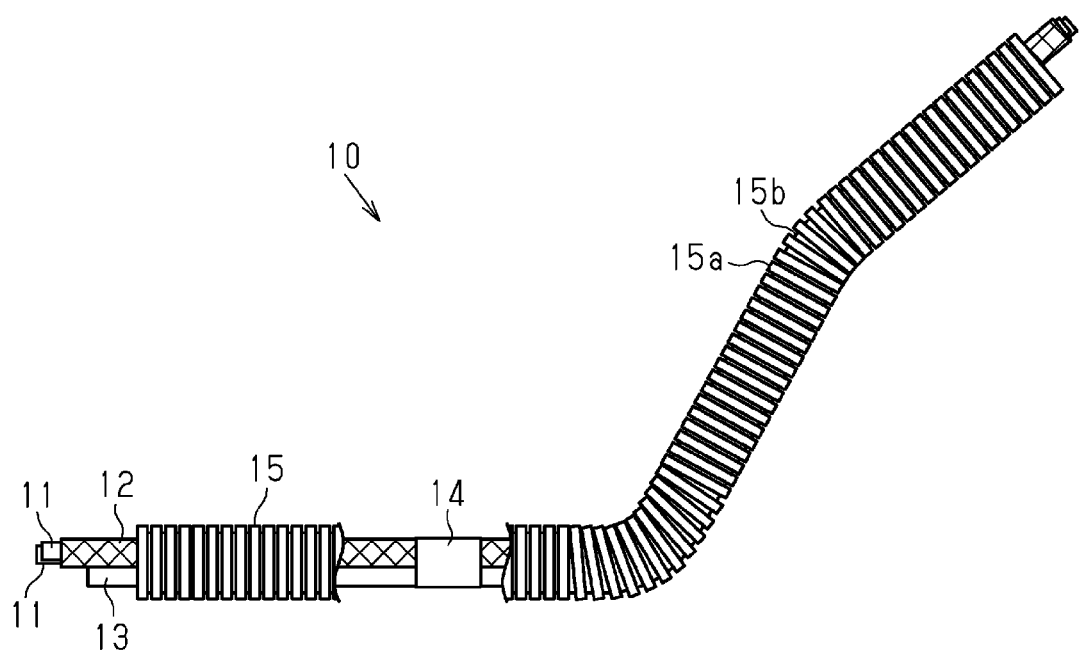
FIG. 1 is a schematic diagram of a wire harness according to a first embodiment.

In the following, a wire harness according to a first embodiment will be described with reference to the drawings. For the sake of convenience, part of the configuration may be exaggerated or simplified in the drawings. In addition, the dimensional ratios of the components may be different from the actual ratios.

As shown in FIG. 1, a wire harness 10 includes a plurality of (here, two) wires 11, a braided member 12 that covers the plurality of wires 11 together, a path regulating member 13 (path regulator) to which the plurality of wires 11 are fixed, and an exterior member 15 (cover) that covers the wires 11, the braided member 12, and the path regulating member 13.

Figure 2:
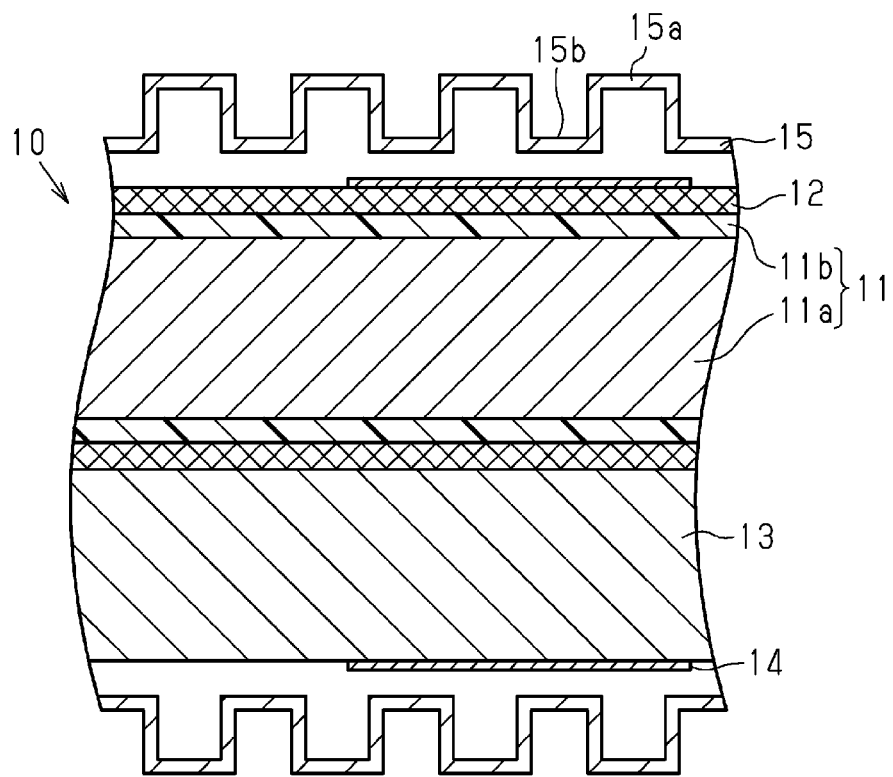
FIG. 2 is a cross-sectional view of the wire harness according to the embodiment.

As shown in FIG. 2, each of the wires 11 includes a core wire 11a and an insulating covering 11b that covers the outer side of the core wire 11a.

The core wire 11a is formed of a stranded wire or a single-core wire, for example. The insulating covering 11b is formed of an insulator. In the present embodiment, the insulating covering 11b is formed of a synthetic resin, for example.

The braided member 12 is obtained, for example, by braiding a plurality of conductive thin metal wires into a mesh and forming the mesh into the shape of a tube, and has high flexibility. The thin metal wires of the braided member 12 are formed of aluminum or an aluminum alloy, for example. The wires 11 are electromagnetically shielded by the braided member 12.

The path regulating member 13 has a substantially columnar shape, for example. The path regulating member 13 is formed in an elongated shape. For example, the path length of the path regulating member 13 is shorter than the path length of the wires 11. This makes it possible to prevent interference between, for example, a connector (not shown) attached to an end portion of the wires and the path regulating member 13. The path regulating member 13 is two-dimensionally or three-dimensionally bent as appropriate in conformity with the wiring path of the wires 11 (wire harness 10), for example. The path regulating member 13 is made of metal, for example. Preferably, the path regulating member 13 is formed of the same kind of metal as the braided member 12, for example, and is formed using aluminum as the base material in the present example. This can suppress the occurrence of electrolytic corrosion between the braided member 12 and the path regulating member 13.

The path regulating member 13 has higher flexural rigidity than the wires 11, and is less likely to bend than the wires 11.

The plurality of wires 11 are fixed to the path regulating member 13 by the fixation member 14 in a state in which the wires 11 are covered together by the braided member 12. The outer circumferential surface of the path regulating member 13 is in contact with the thin metal wires of the braided member 12. The fixation member 14 is provided so as to cover the outer sides of the path regulating member 13 and the braided member 12. The inner circumferential surface of the fixation member 14 is in contact with the path regulating member 13 and the braided member 12. Note that it is possible to use, for example, tape or a cable tie as the fixation member 14.

The installation position of the fixation member 14 is not particularly limited. The fixation member 14 can be provided at any position in the extension direction of the path regulating member 13. For example, the fixation member 14 may be provided at a linear portion of the path regulating member 13, or the fixation member 14 may be provided at a bent portion of the path regulating member 13. Alternatively, the fixation member 14 may be provided so as to cover an end portion of the path regulating member 13.

The number of fixation members 14 is not particularly limited. The fixation members 14 can be provided at a plurality of locations of the path regulating member 13.

The wires 11, the braided member 12, and the path regulating member 13 are covered by the exterior member 15 on the outer sides thereof. The exterior member 15 in the present example is formed so as to cover the entirety of the path regulating member 13. That is, the exterior member 15 of the present example is formed so as to cover the entire length of the path regulating member 13 and to cover the entire circumference of the path regulating member 13. In other words, the path regulating member 13 of the present example is not exposed to the outside of the exterior member 15.

The exterior member 15 has a substantially cylindrical shape, for example. The exterior member 15 is a corrugated tube having flexibility, for example. That is, the exterior member 15 of the present embodiment has a configuration in which annular protrusions 15a and annular recesses 15b are alternately arranged in the longitudinal direction thereof.

Figure 3:
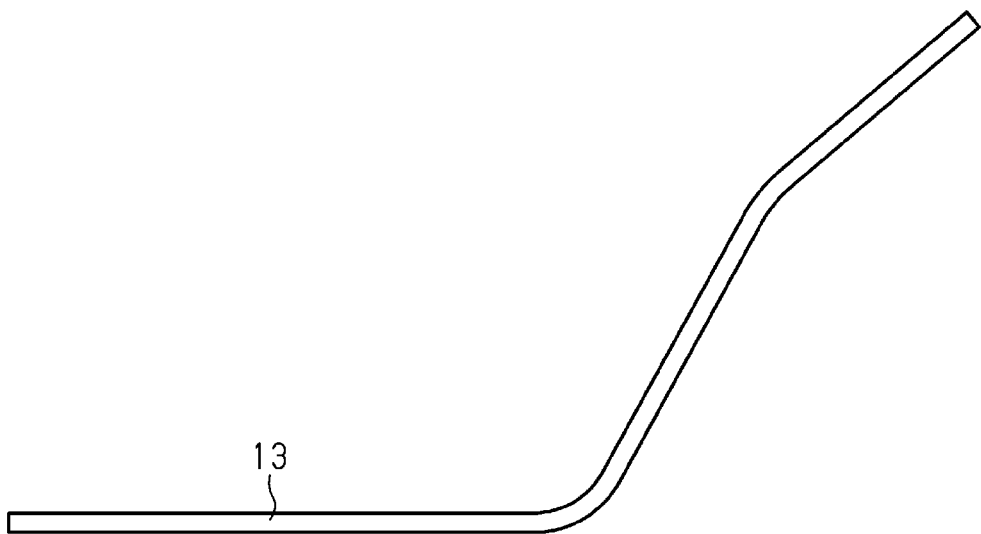
FIG. 3 is an explanatory diagram for illustrating a method for manufacturing the wire harness according to the embodiment.

Next, a method for manufacturing the wire harness 10 will be described. As shown in FIG. 3, the path regulating member 13 that has been bent in conformity with a wiring path is prepared.

Figure 4:
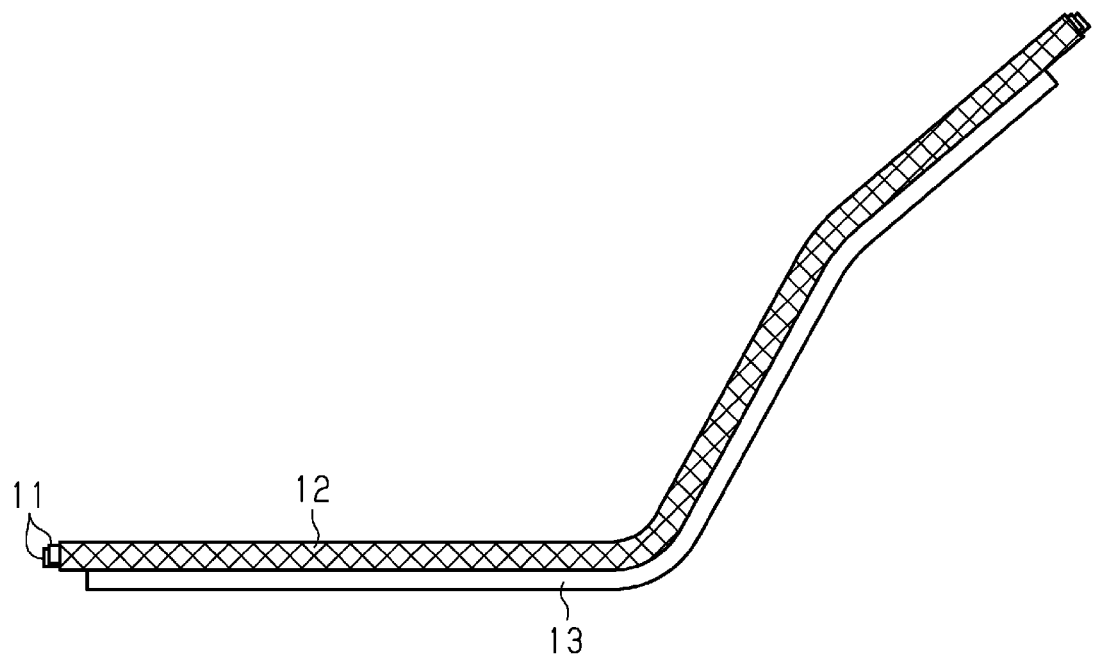
FIG. 4 is an explanatory diagram for illustrating the method for manufacturing the wire harness according to the embodiment.

As shown in FIG. 4, the wires 11 that have been inserted into the braided member 12 are disposed extending along the path regulating member 13.

Figure 5:
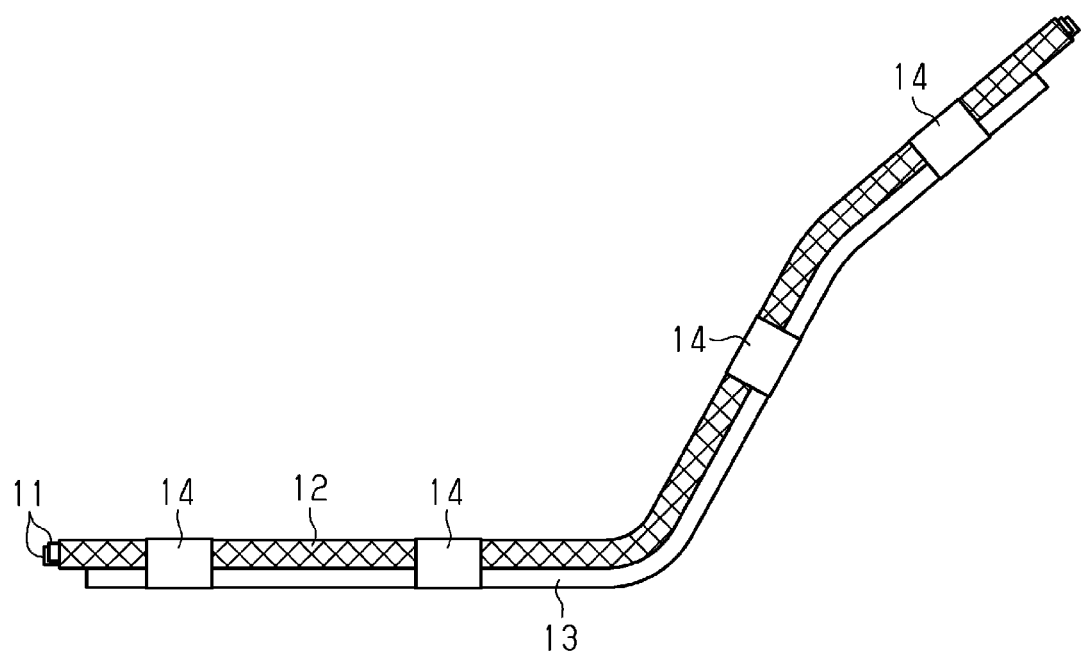
FIG. 5 is an explanatory diagram for illustrating the method for manufacturing the wire harness according to the embodiment.

As shown in FIG. 5, the wires 11 and the braided member 12 are fixed to the path regulating member 13 using the fixation members 14. In the present example, four portions are fixed using the fixation members 14 of a single kind.

Then, the path regulating member 13, the wires 11, and the braided member 12 that have been fixed using the fixation member 14 are inserted into the exterior member 15, whereby a wire harness 10 as shown in FIG. 1 is completed.

The operation of the present embodiment will be described.

The path regulating member 13 has higher flexural rigidity than the wires 11. Thus, when the wires 11 are fixed in a bent state along the path regulating member 13, the path regulating member 13 can withstand, for example, the repulsive force of the wires 11 trying to return to be linear (the state before being fixed) and maintain the wiring path. In addition, when the wires 11 are fixed along the path regulating member 13, it is possible to prevent the wires 11 from being deformed by their own weight with the positions fixed by the fixation members 14 as fulcrums. Accordingly, the path regulating member 13 can regulate the paths of the wires 11.

Effects of the present embodiment will be described.

(1) By fixing the wires 11 to the path regulating member 13 having higher flexural rigidity than the wires 11, it is possible to regulate the paths of the wires 11. Thus, if it becomes necessary to change the wiring path of the wire harness 10, the path regulating member 13 may be two-dimensionally or three-dimensionally bent as appropriate, for example, using a bender machine. Accordingly, the wiring path of the wire harness 10 can be more easily changed as compared with a case where the path of the wire harness 10 is regulated using a protector.

(2) The path of the wire harness 10 is regulated by fixing the wires 11 to the elongated path regulating member 13. Thus, a portion of the wire harness 10 that is located in a section where the path is regulated by the path regulating member 13 can be prevented from increasing in size as compared with a case where the path is regulated using a protector. Accordingly, the wire harness 10 can be prevented from interfering with the surrounding components and the like, and it is therefore possible to increase the ease of assembling the wire harness 10 in a vehicle.

(3) The path regulating member 13 is formed of metal. With this configuration, cracking or fracturing is less likely to occur in the path regulating member 13, for example, during bending as compared with a case where the path regulating member 13 is formed of resin. Thus, the path regulating member 13 has excellent bendability, and it is therefore possible to provide the path regulating member 13 with a portion with a smaller radius of curvature when two-dimensionally or three-dimensionally bending the path regulating member 13. Accordingly, the path of the wire harness 10 can be regulated using a greater variety of paths as compared with a case where the path regulating member 13 is formed of resin.

(4) The braided member 12 serving as an electromagnetic shielding member (electromagnetic shield) covers the outer side of the insulating covering 11b of the wires 11. If the braided member 12 is present on the inner side of the insulating covering 11b, it is necessary to strip off the insulating covering 11b to expose the braided member 12 when grounding the braided member 12. On the other hand, with the above-described configuration, the braided member 12 is present on the outside of the insulating covering 11b, and it is therefore not necessary to strip off the insulating covering 11b to expose the braided member 12 in order to ground the braided member 12. Accordingly, it is possible to improve the workability when grounding the braided member 12 in order to electromagnetically shield the wire harness 10.

(5) The wires 11 and the braided member 12 into which the wires 11 are inserted are fixed along the path regulating member 13 that has been subjected to two-dimensional or three-dimensional bending. That is, the path regulating member 13 is not inserted into the braided member 12. Thus, for example, a path regulating member 13 that has been subjected to three-dimensional bending does not need to be inserted into the braided member 12, and it is therefore possible to prevent the assembly operation of the wire harness 10 from becoming complicated. Accordingly, it is possible to increase the ease of assembling the wire harness 10 as compared with a case where the path regulating member 13 is inserted into the braided member 12.

(6) Since the braided member 12 is formed by braiding a plurality of thin metal wires, it has a large surface area, and is prone to being affected by electrolytic corrosion. Furthermore, because of the thinness, the thin metal wires may be broken by electrolytic corrosion, resulting in a significant reduction in the shielding performance. In contrast, in the present embodiment, the path regulating member 13 is formed of the same kind of metal as the braided member 12 serving as the electromagnetic shielding member. This can prevent the occurrence of electrolytic corrosion in the braided member 12 even if liquid such as water falls on a portion of contact between the path regulating member 13 and the braided member 12. Accordingly, it is possible to suppress a reduction in the shielding performance as a result of breakage of the thin metal wires of the braided member 12 by electrolytic corrosion.

Second Embodiment

Next, a second embodiment of the wire harness will be described. Note that the description of the present embodiment is focused on the differences from the first embodiment, and therefore the same components as those of the first embodiment are denoted by the same reference numerals, and the illustrations thereof may be omitted partially or entirely.

Figure 6:
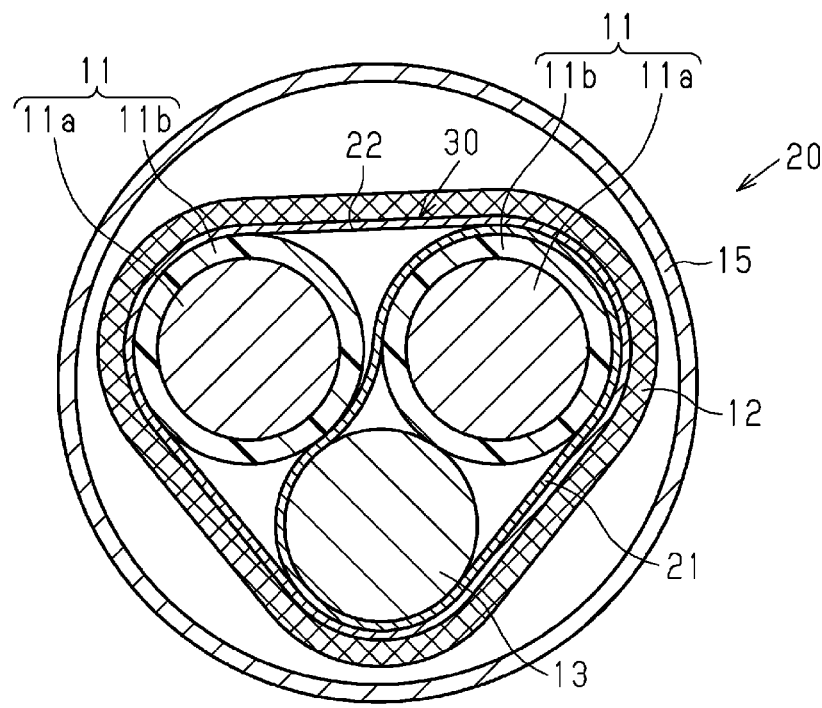
FIG. 6 is a cross-sectional view of a wire harness according to a second embodiment.

As shown in FIG. 6, a wire harness 20 according to the present embodiment includes two wires 11, a braided member 12, a path regulating member 13, and an exterior member 15, as in the case of the first embodiment.

For the wire harness 20 of the present embodiment, the two wires 11 are fixed to the path regulating member 13 by a first fixation member 21 and a second fixation member 22. The first fixation member 21 fixes one of the two wires 11 to the path regulating member 13. Additionally, the second fixation member 22 fixes both of the two wires 11 to the path regulating member 13.

There is no particular limitation to the positions at which the first fixation member 21 and the second fixation member 22 are installed. The first fixation member 21 and the second fixation member 22 can be provided at any position in the extension direction of the path regulating member 13. For example, the first fixation member 21 and the second fixation member 22 may be provided at a linear portion of the path regulating member 13, or the first fixation member 21 and the second fixation member 22 may be provided at a bent portion of the path regulating member 13. The first fixation member 21 and the second fixation member 22 may be provided so as to cover an end portion of the path regulating member 13. The first fixation member 21 and the second fixation member 22 may be provided so as to overlap each other in the radial direction thereof, or may be provided so as not to overlap each other in the radial direction.

The number of first fixation members 21 and second fixation members 22 are not particularly limited. The first fixation members 21 and the second fixation members 22 may be provided at a plurality of locations of the path regulating member 13.

The number of wires 11 that are fixed using the first fixation member 21 and the second fixation member 22 is not particularly limited. For example, the first fixation member 21 may fix one of the two wires 11, and the second fixation member 22 may fix the other of the two wires 11.

It is possible to use, for example, tape or a cable tie as the first fixation member 21 and the second fixation member 22. Both of the first fixation member 21 and the second fixation member 22 may be tape or cable ties. Alternatively, one of them may be tape, and the other may be a cable tie.

The braided member 12 is configured to cover the entirety of an assembly 30 formed by fixing the wires 11 to the path regulating member 13 by the first fixation member 21 and the second fixation member 22 in a state in which the wires 11 are disposed extending along the path regulating member 13.

Figure 7:
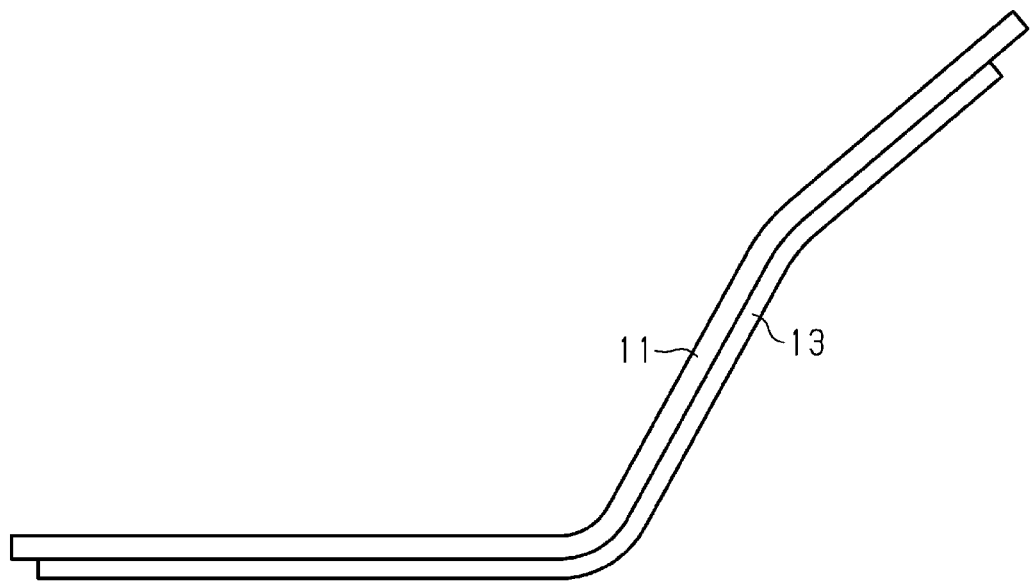
FIG. 7 is an explanatory diagram for illustrating a method for manufacturing the wire harness according to the second embodiment.

Next, a method for manufacturing the wire harness 20 will be described. As shown in FIG. 7, one of the wires 11 is disposed extending along the path regulating member 13 that has been bent in conformity with the wiring path.

Figure 8:
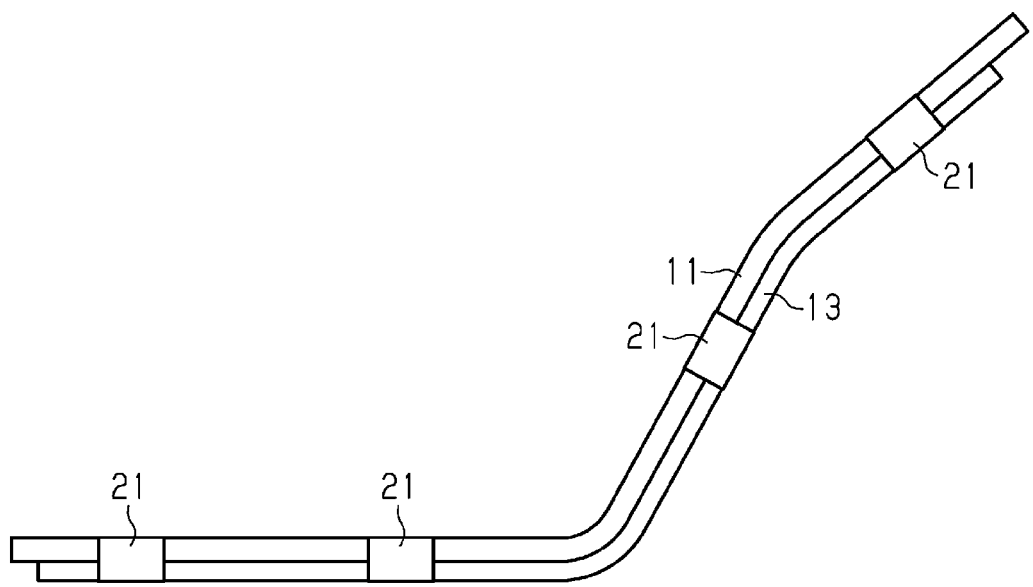
FIG. 8 is an explanatory diagram for illustrating the method for manufacturing the wire harness according to the second embodiment.

As shown in FIG. 8, the path regulating member 13 and the one wire 11 disposed extending along the path regulating member 13 are fixed using the first fixation members 21.

Figure 9:
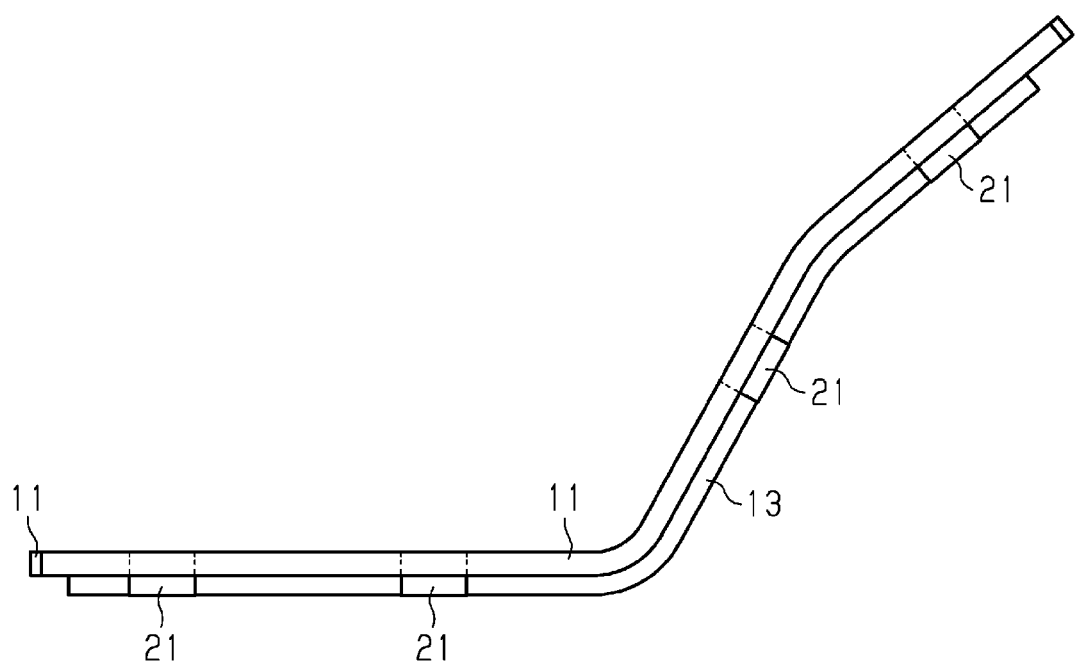
FIG. 9 is an explanatory diagram for illustrating the method for manufacturing the wire harness according to the second embodiment.

As shown in FIG. 9, the remaining one wire 11 is disposed extend along the path regulating member 13 to which the one wire 11 has been fixed.

Figure 10:
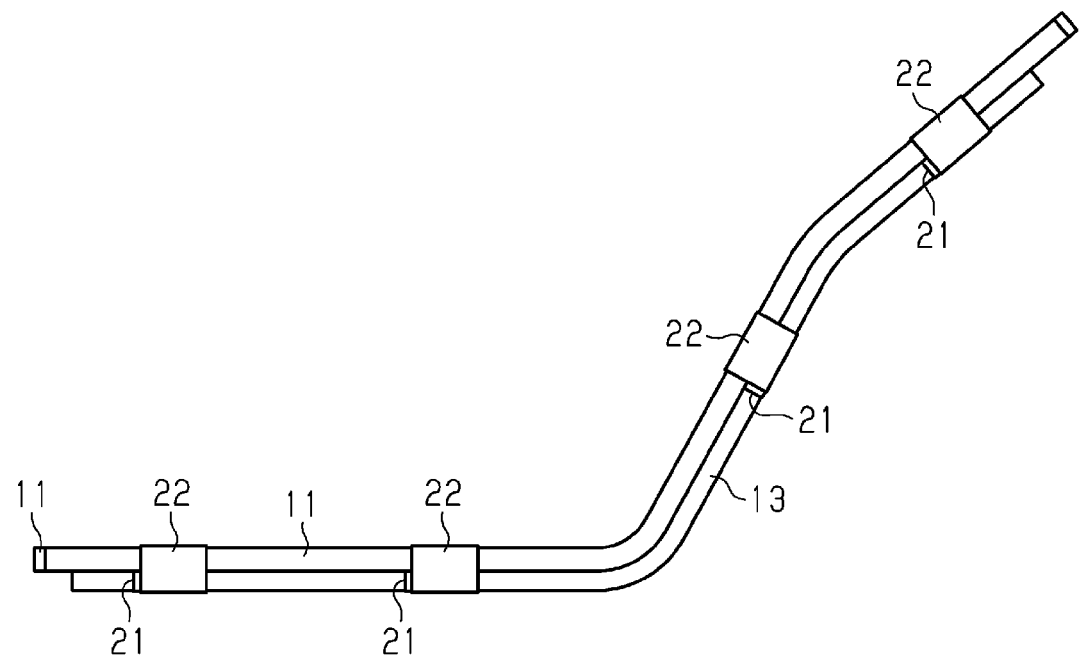
FIG. 10 is an explanatory diagram for illustrating the method for manufacturing the wire harness according to the second embodiment.

As shown in FIG. 10, the path regulating member 13 to which the one wire 11 has been fixed and the remaining one wire 11 disposed extending along the path regulating member 13 are fixed using the second fixation members 22. At this time, each of the second fixation members 22 surrounds and fixes the two wires 11 and the path regulating member 13.

Then, the wires 11 and the path regulating member 13 are inserted into the braided member 12.

Thereafter, as a result of the braided member 12, the wires 11, and the path regulating member 13 being inserted into the exterior member 15, the outer side of the braided member 12 is covered by the exterior member 15, whereby the wire harness 20 is completed.

The operation of the present embodiment will be described.

For the wire harness 20 of the present embodiment, the wires 11 are fixed to the path regulating member 13 using the first fixation members 21 and the second fixation members 22. For example, if the diameter of the wires 11 (core wires 11a) is large, it is possible that the repulsive force generated from the wires 11 may increase when the wires 11 are disposed extending along the path regulating member 13. Therefore, one of the wires 11 is disposed extending along the path regulating member 13, and is fixed using the first fixation members 21. Additionally, the path regulating member 13 to which the one wire 11 has been fixed and the remaining one wire 11 that is disposed extending along the path regulating member 13 are fixed using the second fixation members 22. By fixing the wires 11 stepwise using the first fixation members 21 and the second fixation members 22, the repulsive force of the wires 11 can be reduced as compared with a case where the two wires 11 are fixed using the same fixation member. As a result of reducing the repulsive force of the wires 11, the wires 11 can be easily fixed to the path regulating member 13, for example, even if a portion with a small radius of curvature is provided in the path regulating member 13. When the cross-sectional area of the wires 11 is, for example, 30 $cm^2$ or more, or 40 $cm^2$ or more, the repulsive force of the wires 11 is increased, and, therefore, it is effective to adopt the above-described configuration.

In addition to the effects (1) to (6) of the first embodiment, the above-described wire harness 20 can achieve the following effects.

(7) By separately fixing a plurality of wires 11 to one path regulating member 13, the repulsive force of the wires 11 can be suppressed as compared with a case where a plurality of wires 11 are simultaneously fixed to one path regulating member 13. This makes it possible to easily fix the wires 11 along the path regulating member 13 even if a portion with a small radius of curvature is provided in the path regulating member 13. Accordingly, it is possible to increase the ease of assembling the wire harness 20.

(8) The assembly 30 formed by fixing the wires 11 to the path regulating member 13 using the first fixation members 21 and the second fixation members 22 in a state in which the wires 11 are disposed extending along the path regulating member 13 is inserted into the braided member 12. Additionally, the assembly 30 and the braided member 12 are inserted into the exterior member 15, whereby the wire harness 20 is completed. With this configuration, the braided member 12 is present between the assembly 30 and the exterior member 15 when assembling the wire harness 20, and, therefore, the assembly 30 will not come into direct contact with the exterior member 15. Thus, for example, when inserting the assembly 30 into the exterior member 15, it is possible to suppress displacement of the fixing positions of the first fixation members 21 and the second fixation members 22 due to friction between the assembly 30 and the exterior member 15. In particular, when the first fixation members 21 and the second fixation members 22 are tape, it is possible to prevent the wires 11 from falling off from the path regulating member 13 as a result of the tape being detached by friction between the the assembly 30 and the exterior member 15. Accordingly, it is possible to increase the assembling reliability of the wire harness 20.

Note that the above-described embodiments may be modified as follows.

Although the second embodiment adopts a configuration in which the wires 11 and the path regulating member 13 are inserted into one braided member 12, the present disclosure is not limited thereto.

Figure 11:
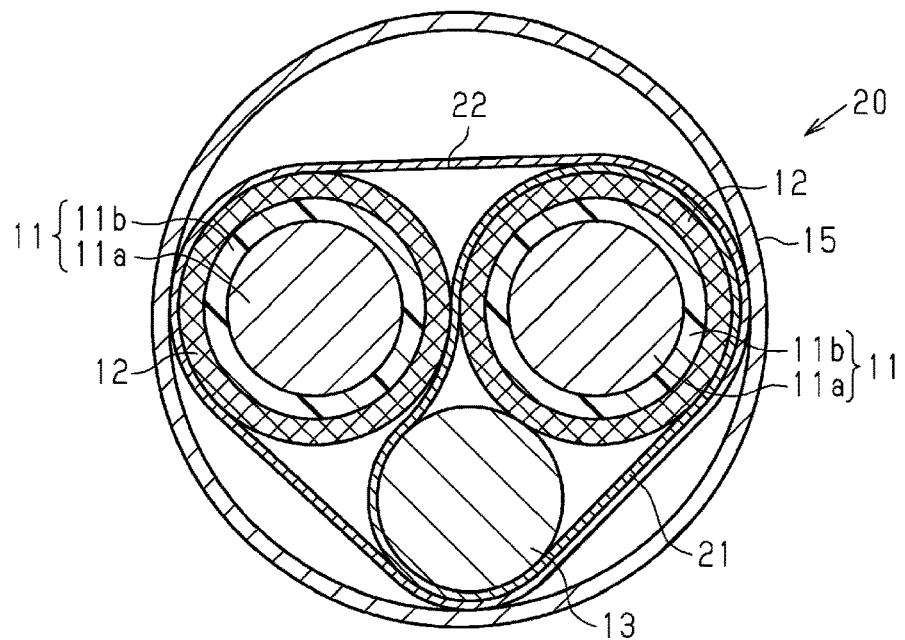
FIG. 11 is a cross-sectional view of a wire harness according to a modification.

As shown in FIG. 11, it is possible to adopt a configuration in which the wires 11 are separately covered by the braided members 12. Such a configuration can also achieve the same effects as those achieved by the second embodiment.

Although the above-described embodiments adopt a configuration in which two wires 11 are fixed to one path regulating member 13, the present disclosure is not limited thereto. For example, it is possible to adopt a configuration in which a separate path regulating member 13 is used for each of the wires 11.

Alternatively, it is possible to adopt a configuration in which three or more wires 11 are fixed to one path regulating member 13. Here, a description will be given of a modification in which, for example, three wires 11 are provided in the configuration of the second embodiment described above. Of the three wires 11, a y-number (where $1 \leq y \leq 2$) of wires are fixed to the path regulating member 13 using the first fixation members 21. Of the three wires 11, a z-number (where $1 \leq z \leq 3$) of wires including at least one wire other than the y-number of wires are fixed to the path regulating member 13 using the second fixation members 22. Such a configuration can also achieve the same effect as the effect (7) of the second embodiment.

Furthermore, all of the wires 11 that are inserted into the exterior member 15 such as a corrugated tube may be fixed to the path regulating member 13, or part of the plurality of wires 11 may be fixed to the path regulating member 13.

Although the above-described embodiments adopt a configuration in which two wires 11 are used, the number of wires 11 can be changed as appropriate.

Although the above-described embodiments adopt a configuration in which the outer side of the insulating covering 11b of each wire 11 is covered by the braided member 12 serving as the electromagnetic shielding member, the present disclosure is not limited thereto. For example, it is possible to adopt a configuration in which an electromagnetic shielding member is interposed between the core wire 11a and the insulating covering 11b.

Although the above-described embodiments adopt a configuration in which the electromagnetic shielding member is formed by the braided member 12, the present disclosure is not limited thereto. For example, it is possible to adopt a configuration in which a metal foil, a conductive sheet or the like may be rolled up in the form of a tube to form an electromagnetic shielding member.

Although the above-described embodiments adopt a configuration in which the path regulating member 13 is formed in a columnar shape, or in other words, formed by a solid body, the present disclosure is not limited thereto. The path regulating member 13 may be formed in a cylindrical shape. Alternatively, the path regulating member 13 may be formed in a polygonal columnar shape or a polygonal tubular shape. Note that when the path regulating member 13 is formed in a tubular shape, it is possible, for example, to adopt a configuration in which one of the plurality of wires 11 is inserted into the path regulating member 13.

Although not specifically stated in the above-described embodiments, it is possible to adopt a configuration in which a plurality of path regulating members 13 are disposed so as to be spaced apart in the longitudinal direction of the wires 11. In such a configuration, for example, it is possible that exterior members 15 such as corrugated tubes may be disposed so as to respectively correspond to the path regulating members 13, and a protector may be used between the exterior member 15. Alternatively, the path regulating members 13 may be provided in one exterior member 15 so as to be spaced apart in the longitudinal direction of the wires 11.

The material of the path regulating member 13 in the above-described embodiments is not limited to metal, and it is possible to use resin or the like.

In the above-described embodiments, a corrugated tube is used as an example of the exterior member 15. However, the present disclosure is not limited thereto, and it is possible to use, for example, another exterior member having flexibility, such as a twist tube.

Figure 12:
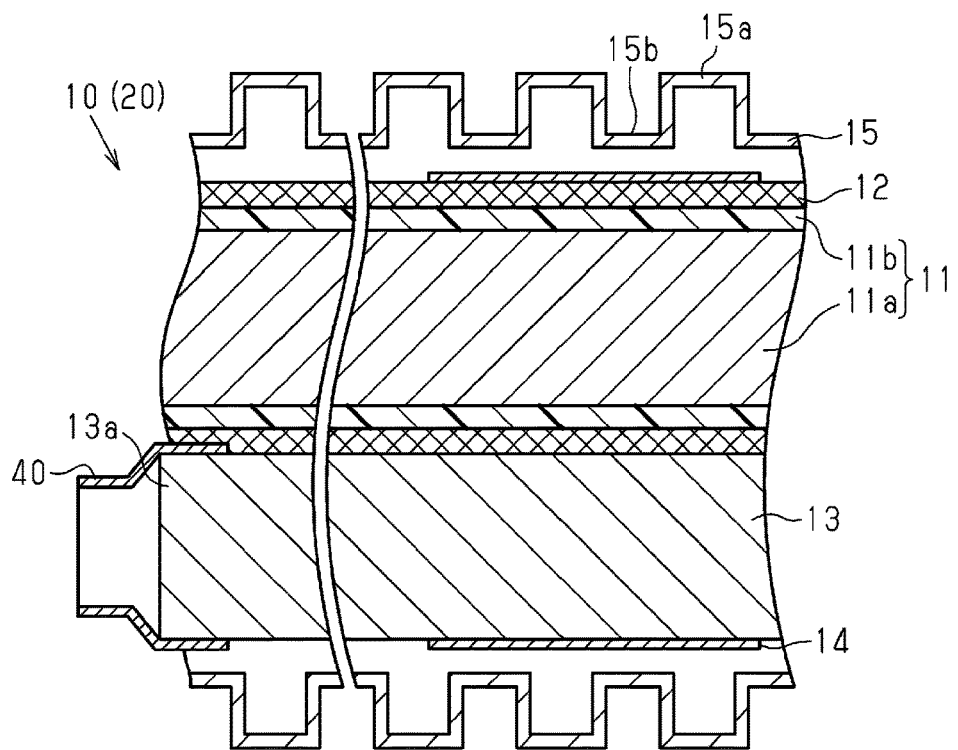
FIG. 12 is a cross-sectional view of a wire harness according to a modification.

Although not specifically stated in the above-described embodiments, it is possible to adopt, for example, a configuration in which an end portion 13a of the path regulating member 13 is provided with a protection member 40 that covers the end portion, as shown in FIG. 12. The protection member 40 is, for example, a stretchable tube that is open at both ends. By stretching the protection member 40 in the radial direction to expand its opening, the protection member 40 is attached to the end portion of the path regulating member 13.

With this configuration, even if the path length of the path regulating member 13 is shorter than the path length of the wires 11, the end portion 13a of the path regulating member 13 will not come into direct contact with the insulating coverings 11b of the wires 11. Thus, for example, when fixing the wires 11 to the path regulating member 13, it is possible to prevent a damage to the insulating coverings 11b as a result of corner portions of the end portion 13a of the path regulating member 13 coming into contact with the insulating coverings 11b. Additionally, after the wire harness 10 or 20 has been mounted to the vehicle body, even if the wires 11 are oscillated by vibrations when the vehicle is traveling, it is possible to prevent the insulating coverings 11b from being damaged by corner portions of the end portion of the path regulating member 13. Accordingly, it is possible to increase the durability of the wire harnesses 10 and 20.

Note that the protection member 40 is not limited to a stretchable tube, and may be changed as appropriate as long as the end portion 13a of the path regulating member 13 will not come into direct contact with the insulating coverings 11b of the wires 11. For example, as the protection member 40, tape may be used, or a substantially bottomed tubular cap that is open only at one end may be used. Alternatively, a protection member may be formed by wrapping a part of the fixation member 14, 21, or 22 around the end portion 13a of the path regulating member 13.

The embodiments and the modifications described above may be combined as appropriate.

It will be apparent to those skilled in the art that the present disclosure may be embodied in other specific forms without departing from the technical concept of the disclosure. For example, the components described in the embodiments above (or one or more aspects thereof) may be partly omitted and/or combined. The scope of the present disclosure is to be defined with reference to the appended claims, along with the full range of equivalents to which the claims are entitled.

The invention claimed is:

1. A wire harness comprising:
a wire including a core wire and an insulating covering that covers the core wire;
an electromagnetic shield that covers and electromagnetically shields at least the core wire;
a path regulator that has higher flexural rigidity than the wire and that is formed in an elongated shape; and
a cover that covers the wire, the electromagnetic shield, and the path regulator,
wherein the wire is fixed along the path regulator.

2. The wire harness according to claim 1,
wherein the electromagnetic shield covers an outer side of the insulating covering.

3. The wire harness according to claim 1,
wherein the electromagnetic shield covers the path regulator.

4. The wire harness according to claim 1, comprising an x-number (where $x \leq 2$) of the wires,
wherein, of the x-number of the wires, a y-number (where $1 \leq y \leq x-1$) of wires are fixed to the path regulator using a first fixation member, and,
of the x-number of the wires, a z-number (where $1 \leq z \leq x$) of wires including at least one wire other than the y-number of the wires are fixed to the path regulator using a second fixation member.

5. The wire harness according to claim 1,
wherein the path regulator is made of metal.

6. The wire harness according to claim 1,
wherein the path regulator is formed of a same kind of metal as the electromagnetic shield.

7. The wire harness according to claim 1,
wherein an end of the path regulator is covered by a protection member.

* * * * *